(12) United States Patent
Scholes et al.

(10) Patent No.: US 8,981,285 B2
(45) Date of Patent: Mar. 17, 2015

(54) X-RAY BACKSCATTERING PART IDENTIFICATION AND TAGGING PROCESS AND TECHNIQUE

(75) Inventors: Dallas S. Scholes, Buckley, WA (US); Morteza Safai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 595 days.

(21) Appl. No.: 12/892,743

(22) Filed: Sep. 28, 2010

(65) Prior Publication Data
US 2012/0074305 A1  Mar. 29, 2012

(51) Int. Cl.
*G06K 7/10* (2006.01)
*G01V 5/00* (2006.01)

(52) U.S. Cl.
CPC .................................. *G01V 5/0025* (2013.01)
USPC ......................................................... 250/271

(58) Field of Classification Search
CPC ......... B07C 5/34; A61B 19/54; G01N 23/203
USPC ........................................................ 250/271
See application file for complete search history.

(56) References Cited

U.S. PATENT DOCUMENTS

| | | | |
|---|---|---|---|
| 4,386,432 A * | 5/1983 | Nakamura et al. ............ | 382/135 |
| 4,974,247 A | 11/1990 | Friddell | |
| 5,982,847 A * | 11/1999 | Nelson ............................ | 378/45 |
| 7,162,035 B1 | 1/2007 | Durst et al. | |
| 7,463,714 B2 | 12/2008 | Edwards et al. | |
| 7,508,910 B2 | 3/2009 | Safai et al. | |
| 7,623,626 B2 | 11/2009 | Safai et al. | |
| 2003/0194052 A1 | 10/2003 | Price et al. | |
| 2010/0206779 A1 * | 8/2010 | Blair et al. .................... | 209/534 |

FOREIGN PATENT DOCUMENTS

| | | |
|---|---|---|
| WO | 02/068945 | 9/2002 |
| WO | 2004/061441 | 7/2004 |
| WO | WO 2010/020407 A2 * | 2/2010 |
| WO | 2011/110863 | 9/2011 |

OTHER PUBLICATIONS

Towe, Bruce C. and Jacobs, Alan M., "X-Ray Backscatter Imaging", IEEE Transactions on Biomedical Engineering, vol. BME-28, No. 9, Sep. 1981.*
PCT, International Search Report and Written Opinion, International Application No. PCT/US2011/050730 (Nov. 3, 2011).

\* cited by examiner

*Primary Examiner* — David Porta
*Assistant Examiner* — Edwin Gunberg
(74) *Attorney, Agent, or Firm* — Thompson Hine LLP

(57) ABSTRACT

Presented is a system and method for verifying the authenticity of a part using non-destructive backscattered X-rays. The method uses an identification tag embedded in the part that when illuminated by X-rays returns backscattered radiation that is detected and used to authenticate the part. The system comprises a source of low energy X-rays that irradiate a part, a detector for detecting backscattered radiation returned from the part, and a means for determining the presence of an authentication tag in the part. In embodiments, the system and method use a tag made of a material that returns a high amount of backscattered radiation thereby providing a high level of contrast in comparison with the part. In embodiments, the placement of the tag in the part, the geometry of the tag, and coding in the tag are used to authenticate the part.

20 Claims, 5 Drawing Sheets

X-RAY BACKSCATTERING PART IDENTIFICATION AND TAGGING PROCESS AND TECHNIQUE

FIELD

Embodiments of the subject matter described herein relate generally to a system and method for a non-destructive X-ray backscattering system for verifying authenticity of a component or part embedded with a polymer-based tag.

BACKGROUND

Counterfeit parts are a multi-billion dollar per year industry. Counterfeit parts not only result in a loss of market share, but can damage the goodwill and image of the company that produces the authentic product. Counterfeit parts that make their way into the supply chain can be difficult to detect, especially when they are electronic or electrical components that have been manufactured into a component such as a circuit board. Counterfeit parts that do not meet manufacturing specifications can cause detects in performance or system failures. In aerospace systems, where such failures can result in a substantial risk of harm to people and property, the rising number of counterfeit parts have forced manufacturers to implement verification and validation programs to identify parts to ensure that system are being manufactured without counterfeit parts. Programs have been developed to ensure that parts are not counterfeit by monitoring parts at specific points in the supply chain together with visual inspection and other part identification methods during or post manufacturing. For example, current solutions involve humans manually inspecting components and subjecting samples of the articles to various chemical and destructive and non-destructive testing methodologies to verify authenticity, or performing electrical performance testing criteria on parts to see if the parts perform to the specification standards or within the tolerance requirements.

These testing methods, however, do not ensure with 100% reliability that a counterfeit part has not been used in a finished component. Manual testing, visual inspection, acoustic testing, and chemical analysis methods, to name a few, can be overcome by counterfeiting. These tests generally look at the external components or the ability of the encasement of a microchip to withstand the washing agents. Electrical performance testing criteria do not ensure the authenticity of the component because they only verify that the outputs of the component or system are correct. An adept counterfeiter, however, can mask the origins or identity of the item, for example by "blacktopping". Blacktopping involves removing a top portion of a casement from an electrical component, for example a chip, and replacing that top portion with material and the design of an authentic part. These blacktopped parts can then be passed off as components identical to the authentic part. For example, chips from a batch that failed testing can be blacktopped, the top portion replaced with designations from another batch that passed testing, and then reinserted back into the supply chain.

Further, the inspection or analytical programs to detect counterfeiting are not cost effective. The programs place a burden on sub-tier suppliers to verify the identity of articles. But the sub-tier suppliers are under tight fiscal and time constraints and detailed examination of every part is costly and time consuming. Destructive testing adds further adds to overall costs in both time and material and not every part can be destructively tested. This leads to opportunities for counterfeit parts to enter the supply chain.

Therefore, there is a need for a cost effective way of ensuring that counterfeit parts do not enter the supply chain or become parts used in manufactured goods. It is desirable that a system and method for detecting counterfeit parts be adaptable to test and authenticate parts at various points of the supply chain or manufacturing processes. It is also desirable that the system and method for detecting counterfeit parts be adaptable to testing both individual parts and parts that have already been assembled into sub-assemblies or finished goods. It is further desirable that the system and method for detecting counterfeit parts be capable of testing parts in a non-destructive manner, thereby enabling every part to be tested and authenticated.

SUMMARY

Presented is a system and method for non-destructive testing and authentication of parts, both individually and as components of sub-assemblies and manufactured goods. The X-ray backscattering part identification and tagging process and technique uses non-destructive soft X-rays to detect an identifying piece of polymer placed in the part or article of interest. The returned signal from the polymer in the part or article of interest is detected and used to authenticate the part or article under test. The returned signal can be compared with a library of returned signals to identify or authenticate the part or article. Because the process is non-destructive, the process can be performed on any part or article of interest, either before, during, or after manufacturing. The process simplifies the task of authentication and reduces the amount of time needed to perform the authentication, allowing a reduction in the costs associated with authentication. Further, the process can be automated, allowing the process to be incorporated into a manufacturing step of manufacturing the sub-assemblies or finished goods. Because the process is non-destructive and automated into a manufacturing step, the process can cost effective implement and used to authenticate every part or article of interest, even at multiple different points in the supply chain.

In an embodiment, the method comprises embedding an identification tag in a component, illuminating the component using an X-ray, for example using a soft X-ray to induce backscattering, detecting the presence of the identification tag from backscattered radiation received from the identification tag, and authenticating the component based on the detected presence of the identification tag. In embodiments, the tag is a polymer tag and has identifying indicia such as the tag's position relative to the component, the size or shape of the tag, or specific coding embedded in the tag. The system comprises a source of low energy X-rays for irradiating a component or part, a detector for detecting backscattered radiation returned from the part or component, and a means for determining a presence of an authenticating tag in the part or component, for example based on the difference in the amount of backscattered radiation returned from authenticating tag relative to the rest of the part or component. In embodiments, the system further comprises a display for manual identification, or a computer for automated image authentication. In embodiments the system is adapted for mobile or handheld use, or for authentication during manufacturing.

The features, functions, and advantages discussed can be achieved independently in various embodiments of the present invention or may be combined in yet other embodiments further details of which can be seen with reference to the following description and drawings.

BRIEF DESCRIPTION OF THE DRAWINGS

The accompanying figures depict various embodiments of the system and method for the X-ray backscattering part identification and tagging process and technique. A brief description of each figure is provided below. Elements with the same reference number in each figure indicated identical or functionally similar elements. Additionally, the left-most digit(s) of a reference number indicate the drawing in which the reference number first appears.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

There is a need to authenticate parts to ensure that counterfeit parts are not being used in manufactured goods. This is especially true in the aerospace industry, where counterfeit goods can cause performance issues or system failures and result in harm to people or property. Prior art methods typically involve destructive testing and/or require significant amounts of manpower to perform the testing. Therefore, a system and method that facilitates authentication of articles of interest in a non-destructive manner is desirable.

The system and method of the present disclosure uses a soft X-ray source to illuminate the article of interest with low power X-rays. The low power X-rays penetrate the article of interest and provide a returned signal comprising backscattered X-rays. An identifying tag, such as a polymer tag, inserted in the article of interest provides a much larger returned signal than the rest of the article and is used to positively identify, and authenticate, the article of interest. The returned signal from the identifying tag can be compared to a library of returned signals for identification and authentication. The system and method of the present disclosure offers time and testing savings, compared to other methods of part authentication.

Figure 1:
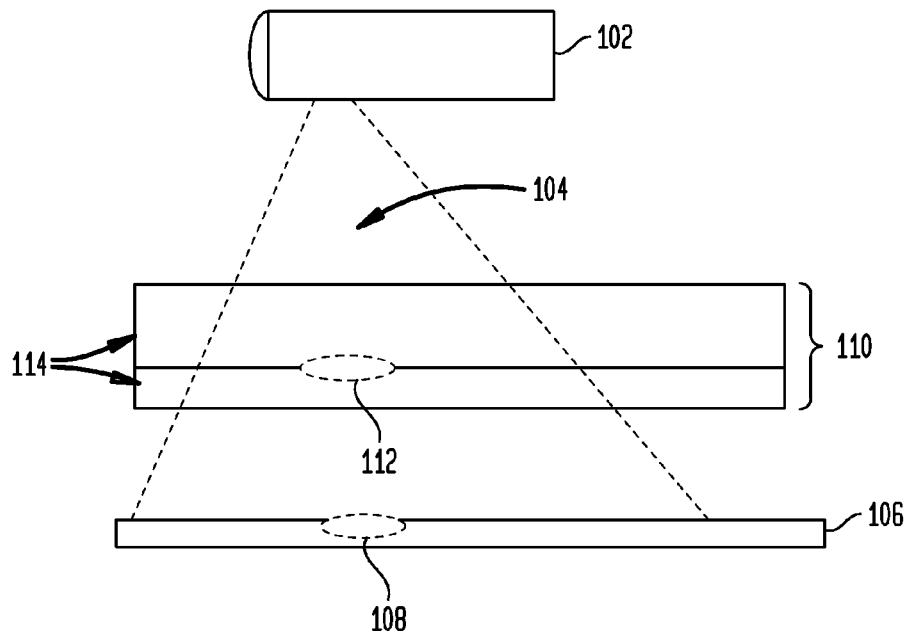
FIG. 1 is a diagram of a conventional transmission x-ray system.

Referring now to FIG. 1, a conventional through X-ray system 100 comprises a high energy X-ray source 102, a detector 106, and the object of interest 110 that is to be irradiated with high energy X-rays 104. Typical high energy X-rays 104 from the high energy X-ray source are 140-160 KeV, for example. With conventional through X-ray system 100, high energy X-rays 104 are used because there must be enough energy in the high energy X-rays 104 to travel through the total density of the materials 114 of the object of interest 110. The object of interest 110 may have a structure 112 that can be used to identify or authenticate the object of interest. With high energy X-rays 104, the structure 112 must have a higher density than the density of the combined total thickness of all of the materials 114 of the object of interest 110 in order to generate, at the detector 106, a shadow 108 of the structure 112. Otherwise, the shadow 108 would not generate sufficient contrast to distinguish it from the rest of the materials 114 of the object of interest 110 at the detector 106. To create a shadow 108 of sufficient contrast, the structure 112 would generally be made out of a solid metallic material. However, for many objects of interest 110, especially chips, a solid metallic material would add expense and complexity to the manufacturing process. Further, using high energy X-rays 104 can damage the internal structures of the object of interest 110. Additionally, conventional through X-ray systems 100 requires access to both the front and the back of the object of interest 110. This can be problematic if the object of interest 110 has been assembled in a component that has multiple layers, both because it necessitates increasing the energy of the high energy X-rays 104 to penetrate the additional layers and because the multiple layers will also create shadows that can obscure or mask shadow 108 of the structure 112. Further, high energy X-rays 104 that have high X-ray flux requires X-ray vaults to protect users from the emitted radiation.

Figure 2:
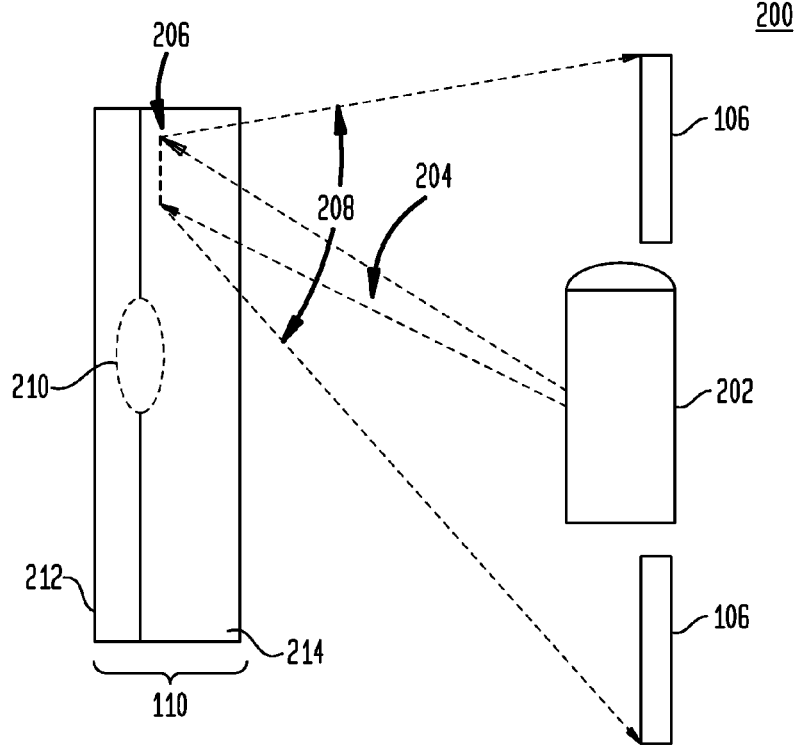
FIG. 2 is a diagram of a backscattering X-ray system in one embodiment of the X-ray backscattering part identification and tagging process and technique.

To overcome these problems, a backscattering X-ray system 200 is used. Referring now to FIG. 2, a backscattering X-ray system 200 is presented. The backscattering X-ray system 200 utilizes a low energy X-ray source 202 that produces low energy soft X-rays 204, for example 40-80 KeV. Soft X-rays, instead of passing through the object of interest 110, penetrate only to a certain penetration depth 206. Some energy from the soft X-rays 104 is returned as backscattered radiation 208 by the object of interest 110 and detected by one or more detectors 106. An embedded tag 210 placed in the object of interest 110 is constructed of a material that returns an increased amount of backscattered radiation 208 in comparison to the object of interest 110. For example, if the object of interest 110 is a microchip, or semiconductor microchip, having a metal, ceramic, or plastic housing 214, an embedded tag 210 made of a polymer type material will return substantially more backscattered radiation 208 to the detectors 106, enabling the embedded tag 210 to be detected. The use of soft X-rays 204 allows the backscattering X-ray system 200 to use a less expensive low energy X-ray source 202 in comparison to the high energy X-ray source 102 of the conventional through X-ray system 100. Advantageously, the backscattering X-ray system 200 only requires access to one side of the object of interest 110, instead of both sides as in the conventional through X-ray system 100. This facilitates use of the backscattering X-ray system 200 with assembled components, especially those having multiple layers, because there will not be additional returned backscattered radiation 208 from the other layers or components to interfere with the backscattered radiation 208 from the embedded tag 210. Further, because the low energy X-rays only penetrate to a certain depth 206, internal structures in the object of interest 110 that are sensitive to X-ray energy can be placed in a lower layer 212 below the penetration depth 206 where the soft X-rays 204 reach. Thus the backscattering X-ray system 200 allows testing of objects of interest that could not be tested using a conventional through X-ray system 100.

Figure 3:
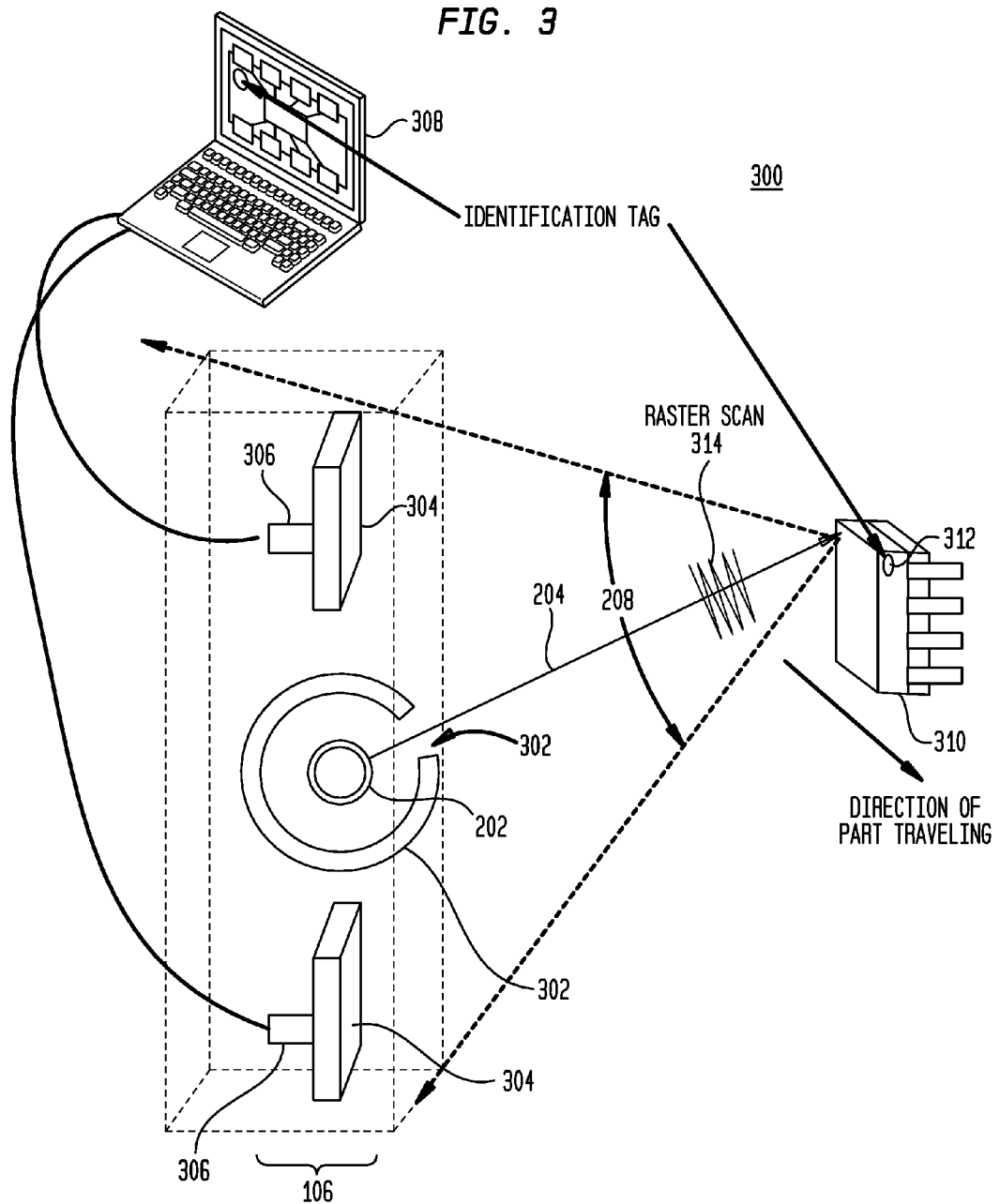
FIG. 3 is a diagram of a scanning backscattering X-ray system for detecting a identification tag in a microchip in one embodiment of the X-ray backscattering part identification and tagging process and technique.

Referring now to FIG. 3, an embodiment of a scanning backscattering X-ray system 300 is presented. The scanning backscattering X-ray system 300 comprises a low energy X-ray source 202 for producing soft X-rays 204. The soft X-rays 204 pass through a moving scanning aperture 302 that enables scanning of the microchip 310 in a predetermined pattern. For example, the aperture 302 can be a rotating aperture that also translates rectilinearly, thus producing the well known raster scan pattern 314. In embodiments, the scan pattern 314 can be a raster line-by-line pattern, a Lissajous pattern, a vector-based pattern, or any other pattern as would be understood in the art. The scanning aperture 302 enables the backscattered radiation 208 detected by the detectors 106 to be associated with a position on the microchip 310, and thus the position of the embedded identification tag 312 within the microchip 310 relative to the other structures within the microchip 310 can be determined. In an embodiment, the detectors 106 comprise a scintillation pad 304 and a photomultiplier tube 306, although other X-ray detectors 106 including solid state detectors as would be understood in the art are also contemplated. In an embodiment, the scintillation pad 304 is comprised of a polyplastic, such as PVC (Polyvinyl Chloride), that is sensitive to the backscattered radiation 208 and produces photons when excited by the backscattered radiation 208. The photons are multiplied by the photomultiplier tube 306 which enables detection using photon detectors such as photodiodes, CCDs, or other photosensors. In an embodiment, a computer imaging system 308 uses the detected photons to produce an image or set of data representing the imaging of the microchip 310 and/or embedded identification tag 312.

Figure 4:
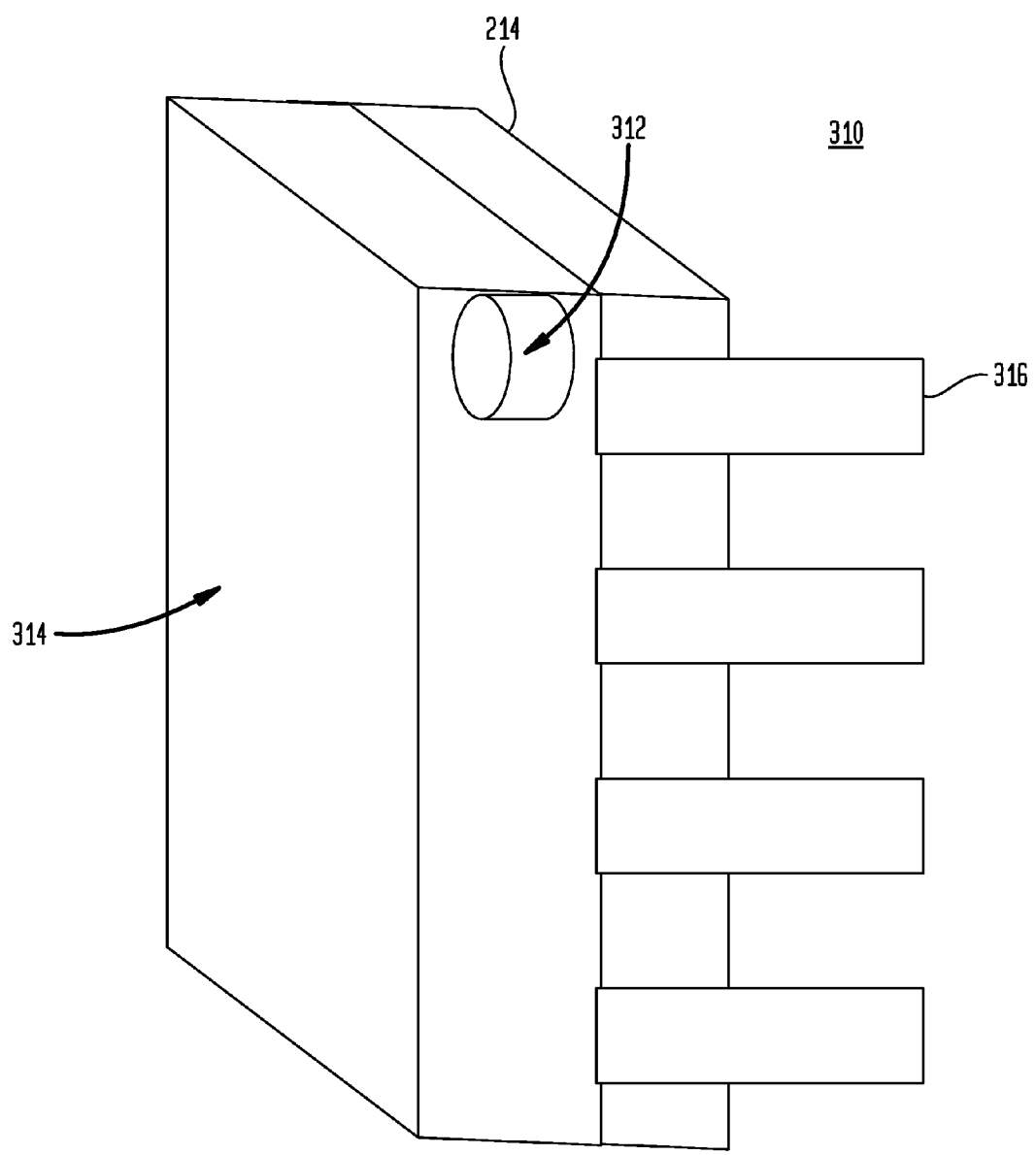
FIG. 4 is a diagram of a microchip having an identification tag in one embodiment of the X-ray backscattering part identification and tagging process and technique.

Referring now to FIG. 4, an embodiment of a microchip 310 comprising a housing 214 that has a protective cap 314, an embedded identification tag 312, and electronic leads 316 is presented. In embodiments, the housing 214 and protective cap 314 are metal, ceramic, or plastic, and the embedded identification tag 312 is a carbon chain polymer such as polyurethane or other material capable of producing a high return signal compared with the materials in the housing 214 and protective cap 314. Generally, the material of the embedded identification tag 312, e.g. a polymer base, is chosen to have a large scattering effect of the soft X-rays 204 incident upon the embedded identification tag 312 to produce a larger amount of backscattered radiation 208 than the surrounding materials. The embedded identification tags 312 can be small, in embodiments no more than 0.5 mm. In an embodiment, the embedded identification tag 312 is constructed in the material of the housing, either by placing it within the protective cap 314 close to the surface or under the protective cap 314 but above the semiconductor layer or any other parts or hardware. By placing the embedded identification tag 312 within the protective cap 314, it discourages a party from "blacktopping" a microchip that has been disqualified or returned from the manufacturer for lack of performance. In "blacktopping", the outer layer of the protective cap 314 is removed and replaced with identical material and then markings applied to the protective cap 314 to make it appear to be a different chip. By integrating the embedded identification tag 312 into the cap, it makes it difficult to "blacktop" a microchip without damaging the identifying embedded identification tag 312. Further, as part of the disqualification process, a microchip 310 that fails certification can be purposefully marred or damaged by the tester in such a way as to permanently destroy or disfigure the shape or other identifying characteristic of the embedded identification tag 312.

In another embodiment, the embedded identification tag 312 is placed on or within the semiconductor microchip (not shown). Because chips are constructed in layers, it is possible to construct an upper layer of the semiconductor chips that has an embedded identification tag 312 that will not affect the operation of the lower layers. In an embodiment, the embedded identification tag 312 can reside in a top non-functioning layer, while the lower layers are functional layers. In these embodiments, the embedded identification tag 312 is designed to produce a stronger returned signal of backscattered radiation 208 than the housing 214, protective cap 314, and any other upper layer of the semiconductor microchip 310.

Figure 5:
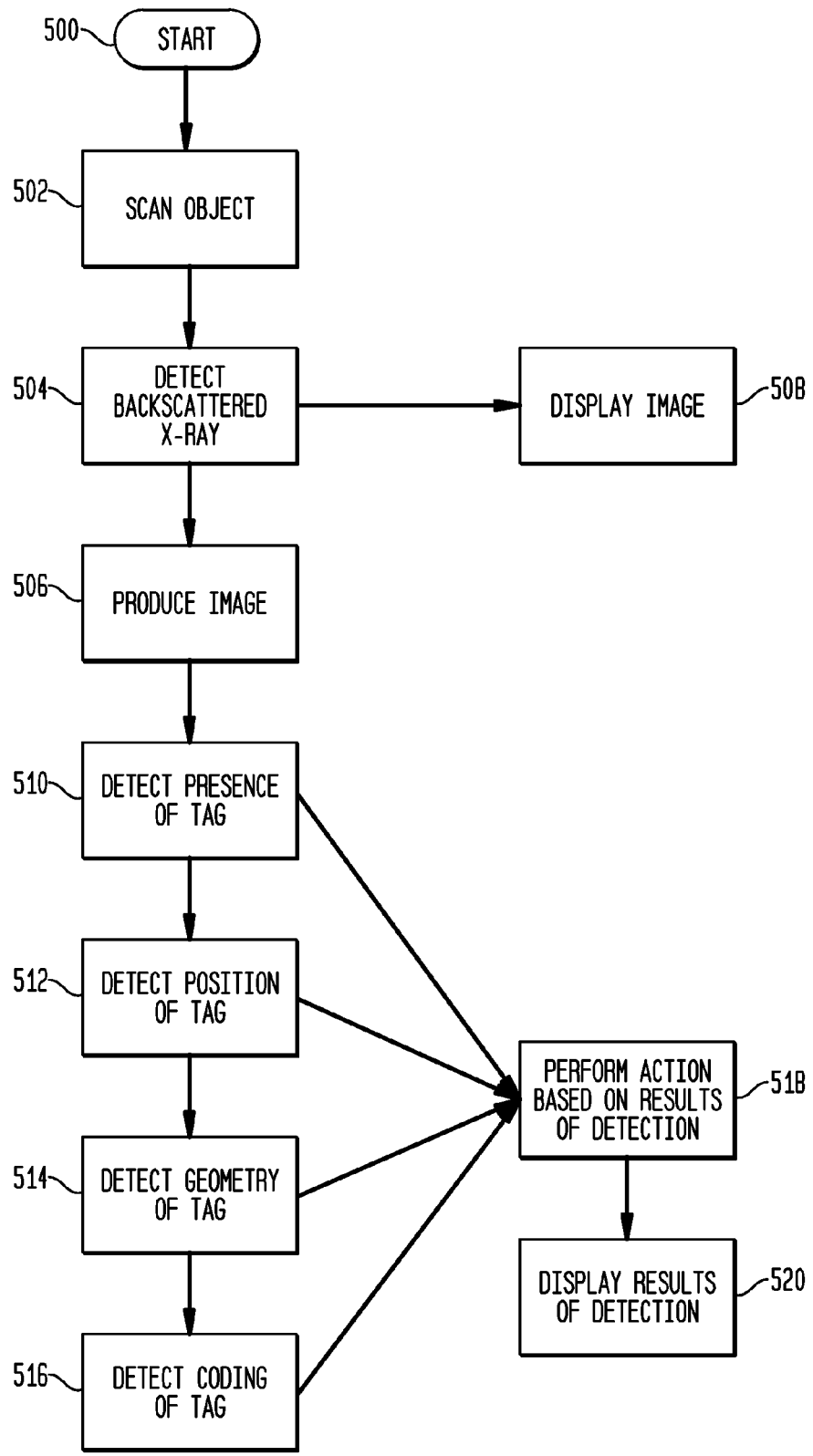
FIG. 5 is a flowchart of a process to authenticate an article of interest in one embodiment of the X-ray backscattering part identification and tagging process and technique, and, FIG. 6 is a flowchart of a manufacturing step to authenticate an article of interest in one embodiment of the X-ray backscattering part identification and tagging process and technique.

Referring now to FIG. 5, an exemplary part identification process 500 is presented. The scanning backscattering X-ray system 300 scans 502 the object of interest 110. The backscattered radiation 208 is detected 504 by the detectors 106. A computer/imaging system 308 produces 506 an image of the scanned object of interest 110 from the detected backscattered radiation 208. In the case of a handheld or portable scanning backscattering X-ray system 300, this image can be displayed 508. However, the image can also be an ordered set of data suitable for computer analysis without being displayed 508. In an embodiment, the computer/imaging system 308 detects the presence 510 of the embedded identification tag 312, for example by detecting a threshold level of return of backscattered radiation 208 above the average level of the microchip 310. In an embodiment, the computer/imaging system 308 detects the position 512 of the embedded identification tag 312, for example by comparing the position of backscattered radiation 208 of the embedded identification tag 312 to the position of the rest of the microchip 310. In an embodiment, the computer/imaging system 308 detects the geometry 514 of the embedded identification tag 312, for example by analyzing the shape of the of backscattered radiation 208 of the embedded identification tag 312. Non-limiting exemplary shapes include a dot, circle, oval, sphere, square, rectangle, cube, star, triangle, quadrilateral, a logo, a letter, a symbol, a two-dimensional shape, a three-dimensional shape, etc. In an embodiment, the computer/imaging system 308 detects coding in the embedded identification tag 312, for example by analyzing the geometric details of the of backscattered radiation 208 of the embedded identification tag 312. In embodiments, coding can be a bar code of alternating high backscattering and low backscattering materials in the embedded identification tag 312, including an EPC or Electronic Product Code, a one-dimensional bar code and two-dimensional bar code, or any other bar code as would be understood in the art. In an embodiment, the results of the detecting 510, 512, 513, and 516 causes the computer/imaging system 308 to perform an action 518 in response to the detecting step, for example by sending a signal to a manufacturing apparatus to use or reject the microchip 310. In an embodiment, the computer/imaging system 308 displays a status result 520 of the detecting 510, 512, 513, and 516.

Figure 6:
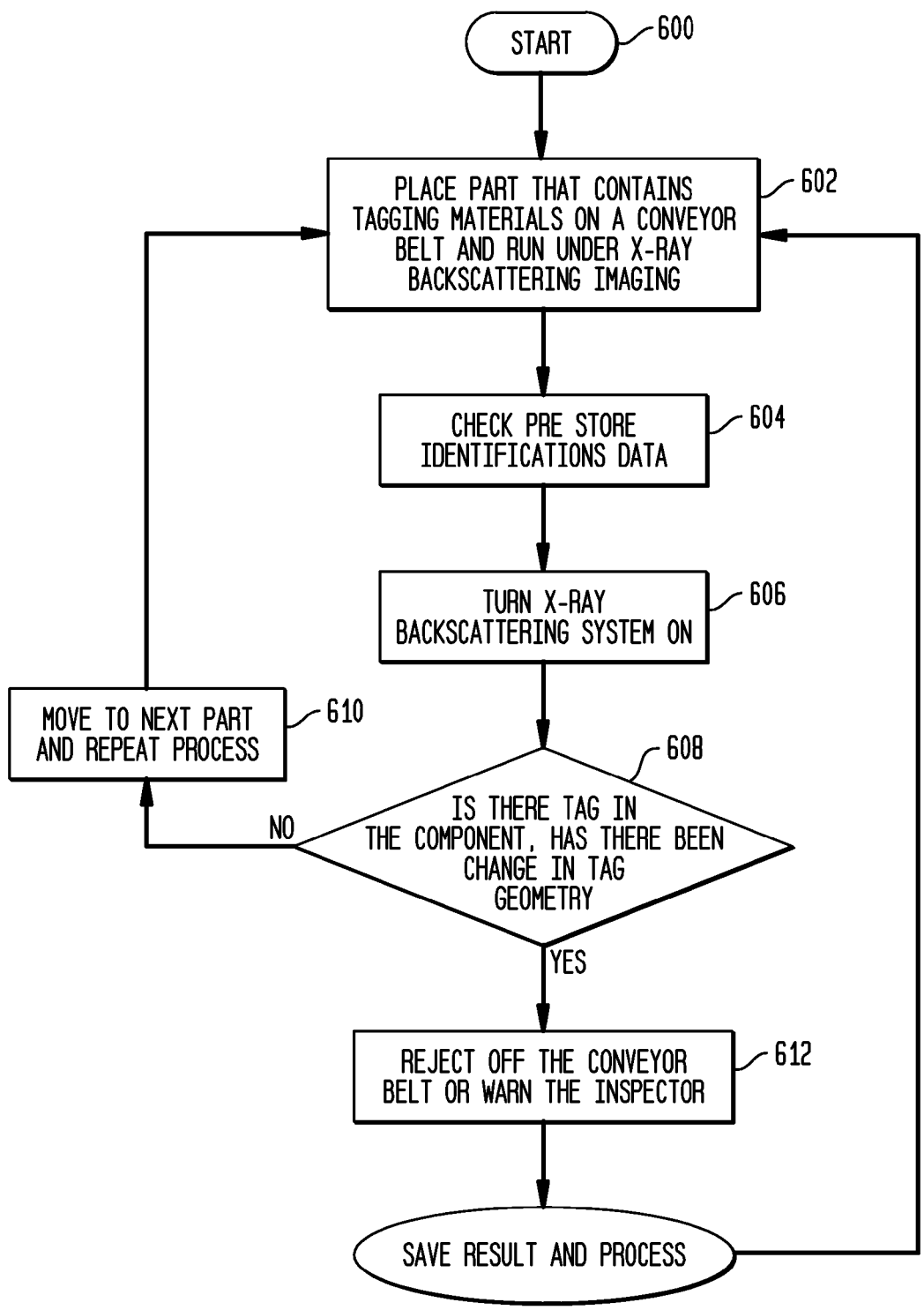

Referring now to FIG. 6, a flowchart of a manufacturing step to authenticate a part 600 is presented. Although the process is described as a step in a manufacturing process for authenticating a part to be used during the manufacture of a product, it is contemplated that the process is adaptable to other processes as well, for example an inventory checking process for completed goods arriving from a sub-manufacturer. In the manufacturing step, a part is placed 602 on a conveyer belt which transports the part under a scanning backscattering X-ray system 300. A computer/imaging system 308 checks 604 a library store of identification data for data associated with the part. The scanning backscattering X-ray system 300 is turned on and scans 606 the part. The computer/imaging system 308 compares the embedded identification tag 312 in the part with the identification data in the library store. If there is an embedded identification tag 312 that authenticates the part, then the part moves 610 to the next step in the manufacturing process. If the embedded identification tag 312 is not present, or does not match the identification data from the library store, then the part is rejected 612 and moved off of the conveyor belt. As a further step a message or signal is presented to an inspector regarding the chip. In embodiments, the part is a chip, a component, a sub-assembly, a line replaceable unit, or a finished good.

Because soft X-rays 204 are able to pass through packaging, it is possible to use the scanning backscattering X-ray system 300 to authenticate components even if the components have already been placed within protective packaging or assemblies. Further, the process can be used to authenticate and count components without removing them from the protective packaging or assemblies. Some components can only be opened in clean rooms without being damages. The scanning backscattering X-ray system 300 allows inventorying and counting of components without requiring them to be removed from their protective packaging or requiring an available clean room. Further, the scanning backscattering X-ray system 300 allows components to be verified on working systems without requiring them to be first removed. For example, parts installed in an aircraft or spacecraft can be authenticated or identified without removing them from the craft. The scanning backscattering X-ray system 300 also allows identification or authentication of embedded identification tags 312 in biological subjects or embedded identification tags 312 that are underwater or underground.

The embedded identification tags 312 and scanning backscattering X-ray system 300 can be used to facilitate the identification of the origin of goods for military, industrial, or commercial purposes. For example, embedded identification tags 312 can be embedded in products to verify their origin of manufacture. In another example, embedded identification tags 312 can be used in harsh environmental conditions where surface indicia could be removed, damaged or obscured. For example, the embedded identification tags 312 can be placed in hazardous waste containers or the hazardous waste itself to identify the contents in the event of a spill, or in case of the loss of identifying labels. Similarly, paints, solvents, gunpowder, or other materials can include embedded identification tags 312 for future identification. In another embodiment, the embedded identification tags 312 can be combined with reactive agents such that exposure to air or light changes the properties of the embedded identification tags 312. In these embodiments, the embedded identification tags 312 can be utilized as markers to indicate whether a closed container has been tampered with or otherwise opened.

The embodiments of the invention shown in the drawings and described above are exemplary of numerous embodiments that may be made within the scope of the appended claims. It is contemplated that numerous other configurations of the system and method for using backscattered X-rays to verify the authenticity of a components having embedded polymer-based tags may be created taking advantage of the disclosed approach. It is the applicant's intention that the scope of the patent issuing herefrom will be limited only by the scope of the appended claims.

What is claimed is:

1. A method for verifying the authenticity of a component, the method comprising:
   embedding an identification tag below a surface of the component, the identification tag having a selected geometric shape and composed of a polymer type material that returns an increased amount of backscattered radiation in comparison to the component;
   illuminating the component using low energy soft X-rays to penetrate only to a certain penetration depth of the component by a low energy X-ray source, said identification tag being within said certain penetration depth, and said certain penetration depth being above internal structures in said component that are sensitive to X-ray energy;
   receiving returned backscattered radiation of said low energy soft X-rays from said identification tag and from said component by one or more detectors;
   detecting a presence of said identification tag from an increased amount of said returned backscattered radiation from said identification tag in comparison to backscattered radiation from said component by said one or more detectors; and
   authenticating the component based on said detected presence of said identification tag.

2. The method of claim 1, wherein said illuminating further comprises scanning said component in a pattern using said low energy X-ray source.

3. The method of claim 2, further comprising:
   displaying an image selected from the group consisting of said identification tag, said component, said component and said identification tag, and at least said component and said identification tag by an imaging system; and
   wherein said authenticating the component includes comparing said image of said identification tag with an image of an identification tag of an authentic component in a library store.

4. The method of claim 2, wherein said scanning is selected from the group consisting of a raster scan, a Lissajous scan, and a vector scan.

5. The method of claim 2, wherein said receiving further comprises creating an ordered set of data from said received backscattered radiation from said tag and from said component correlating to positions on said component.

6. The method of claim 5, further comprising comparing said ordered set of data with data associated with an identification tag for an authentic component; and wherein said authenticating the component is based on said comparing.

7. The method of claim 5, further comprising comparing said ordered set of data with a data from of a library of identification tags associated with authentic components; and wherein said authenticating said component is based on said comparing.

8. The method of claim 1, wherein said low energy soft X-rays are less than 80 KeV.

9. The method of claim 1, wherein said object includes a protective cap, and embedding said identification tag includes embedding said identification tag below a surface of said object at a location selected from within said protective cap and under said protective cap.

10. The method of claim 9, wherein said identification is comprised of polyurethane.

11. The method of claim 1, wherein said identification tag has an identifying indicia selected from the group consisting of a predetermined position of said identification tag relative to the component, a geometry of said identification tag associated with an authentic component, a coding of said identification tag for identifying the manufacturer, and a coding of said identification tag for identifying the component.

12. A method for authenticating a component in a manufacturing process, the method comprising:
   positioning the component in proximity to a scanning backscattering X-ray system having a low energy soft X-ray source and at least one detector of backscattered low energy soft X-rays from said X-ray source;
   scanning said component with low energy soft X-rays from said low energy soft X-ray source at an energy selected to penetrate said component only to a certain penetration depth to produce a detected image of said component to determine whether said component contains an identification tag associated with an authentic component, said identification tag made of a polymer type material that will return more backscattered radiation to said at least one detector than from surrounding materials of said component, and being below a surface of said component at a selected depth within said certain penetration depth, and having a selected identifying indicia;

comparing said detected image of said tag with an image from a library of tags associated with authentic components to determine whether said detected image includes said identification tag associated with an authentic component;

rejecting the component when the component does not have said identification tag associated with said authentic component; and selecting said certain penetration depth to be above internal structures in said component that are sensitive to X-ray energy.

13. The method of claim 12, wherein said rejecting said component further comprises producing an alert signal regarding said component.

14. The method of claim 12, wherein said comparing further comprises determining whether said detected image includes a tag having identifying indicia selected from a predetermined position of said tag in relation to the component, a geometry of said tag associated with an authentic component, a coding of said tag for identifying the manufacturer, and a coding of said identification tag for identifying the component; and wherein said rejecting the component further comprises rejecting the component when the tag does not have said identifying indicia.

15. A part authentication system, the system comprising:
a source of low energy soft X-rays that penetrate the part only to a certain penetration depth, said certain penetration depth being above internal structures in said part that are sensitive to X-ray energy;
a detector for detecting backscattered radiation from said low energy soft X-rays returned from said part; and
said detector detecting a presence of an authenticating tag in said part by detecting energy returned as backscattered radiation from said low energy soft X-rays from said part and said tag, said tag being embedded below a surface of said part, said tag having a predetermined geometric shape and composed of a polymer type material that returns an increased amount of backscattered radiation in comparison to backscattered radiation from said part at said certain penetration depth, from a difference in an amount of backscattered radiation returned from said part due to said authenticating tag.

16. The system of claim 15, wherein said means for determining a presence of an authenticating tag in said part, is selected from the group consisting of a display for displaying the backscattered radiation returned from said part, a computer imaging system for comparing an ordered set of data representing a detected background radiation returned from an authenticating tag in said part with a data associated with an authenticating tag of an authentic component, and a computer imaging system for comparing an ordered set of data representing a detected background radiation returned from an authenticating tag in said part with a library of data of authenticating tags of an authentic components.

17. The system of claim 15, wherein said detector is selected from the group consisting of a scintillation material in optical communication with a photomultiplier tube, and a solid state detector.

18. The system of claim 15, wherein said source of low energy X-rays emits radiation having an energy of less than 80 KeV.

19. The system of claim 15, further comprising a scanning system for irradiating said part with said low energy X-rays in scan pattern; and wherein said scan system is adapted to scan in a pattern selected from the group consisting of a raster scan, a Lissajous scan, and a vector scan.

20. The system of claim 15, further comprising:
a part having a authentication tag made of polyurethane; and
wherein said authentication tag has an indicia of authenticity selected from one or more of
a greater return of backscattered radiation than the average return of backscattered radiation from the part;
a predetermined position of said polymer authentication tag relative to the part, said predetermined position being associated with an authentic part;
a geometry of said polyurethane authentication tag that is associated with an authentic part;
a coding of said polyurethane authentication tag that identifies the manufacturer; and
a coding of said polyurethane authentication tag that identifies the part.

* * * * *